(12) United States Patent
Venema et al.

(10) Patent No.: US 7,077,318 B2
(45) Date of Patent: Jul. 18, 2006

(54) PICK-TO-LIGHT SYSTEM FOR REPLENISHING MANUFACTURING KITS

(75) Inventors: Steven C. Venema, Kirkland, WA (US); James J. Troy, Issaquah, WA (US); Michael L. Callaghan, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 245 days.

(21) Appl. No.: 10/347,754

(22) Filed: Jan. 21, 2003

(65) Prior Publication Data

US 2004/0083144 A1 Apr. 29, 2004

Related U.S. Application Data

(60) Provisional application No. 60/421,968, filed on Oct. 29, 2002.

(51) Int. Cl.
*G06K 7/10* (2006.01)
(52) U.S. Cl. .................... 235/462.01; 235/383
(58) Field of Classification Search ........... 235/462.01, 235/383, 385; 705/22, 23, 28, 29; 700/95, 700/115, 215, 242
See application file for complete search history.

(56) References Cited

U.S. PATENT DOCUMENTS

| | | | | |
|---|---|---|---|---|
| 3,739,339 A | * | 6/1973 | Hillhouse et al. ............ 340/5.9 |
| 4,025,766 A | * | 5/1977 | Ng et al. ...................... 705/28 |
| 4,821,197 A | * | 4/1989 | Kenik et al. ................. 700/106 |
| 4,920,488 A | * | 4/1990 | Filley ........................... 705/28 |
| 5,113,349 A | * | 5/1992 | Nakamura et al. .......... 700/215 |
| 5,455,409 A | * | 10/1995 | Smith et al. ................. 235/385 |
| 5,505,473 A | * | 4/1996 | Radcliffe .................... 280/79.2 |
| 5,812,986 A | * | 9/1998 | Danelski ...................... 705/22 |
| 5,877,962 A | * | 3/1999 | Radcliffe .................... 700/215 |
| 6,124,800 A | * | 9/2000 | Beard et al. .................. 340/5.9 |
| 6,236,901 B1 | * | 5/2001 | Goss ........................... 700/95 |
| 6,427,091 B1 | * | 7/2002 | Davis et al. ................. 700/115 |
| 6,650,225 B1 | * | 11/2003 | Bastian et al. .............. 340/5.92 |
| 6,711,458 B1 | * | 3/2004 | Kofoed ........................ 700/213 |
| 6,847,861 B1 | * | 1/2005 | Lunak et al. ................ 700/242 |

* cited by examiner

Primary Examiner—Michael G. Lee
Assistant Examiner—Kumiko C. Koyama
(74) Attorney, Agent, or Firm—Harness Dickey & Pierce P.L.C.

(57) ABSTRACT

An inventory management system and method for replenishing manufacturing kits includes a shelving system, a mobile pick station, a data server, and a network node proxy. The mobile pick station communicates with both the shelving system via the network node proxy, and to the data server via a communications interface. Manufacturing kit specification data is supplied to the system through the data server and is thus used to generate a map of the manufacturing kit onto a touchscreen display located on the mobile pick station. The map displays the type, quantity, and placement of parts within the manufacturing kit. System components are tracked using a barcode system that reduces the frequency of incorrectly selected and placed parts.

18 Claims, 6 Drawing Sheets

PICK-TO-LIGHT SYSTEM FOR REPLENISHING MANUFACTURING KITS

CROSS-REFERENCE TO RELATED APPLICATIONS

This application claims priority to U.S. Patent Application No. 60/421,968 filed on Oct. 29, 2002. The disclosure of which is incorporated herein by reference.

FIELD OF THE INVENTION

The present invention relates to an inventory management system, and more specifically, to a system and method for replenishing manufacturing kits using a pick-to-light system.

DISCUSSION OF THE INVENTION

The inventory management system according to the present invention reduces labor costs and decreases the inaccuracies of manual kit replenishment systems. The present replenishing system provides a shelving system electronically divisible into racks, each rack having vertical and horizontal channels containing shelf communication circuitry. Within each rack there are a plurality of storage bins containing the parts needed for replenishing the manufacturing kits. Each storage bin and manufacturing kit are identified by barcodes and read into the system with scanners.

A rack control unit located proximate each rack includes a rack processor in communication with other rack processors via a communications bus linking racks within the shelving system. It also controls shelf electronics embedded within the vertical and horizontal channels of each rack and indirectly communicates to a pick station processor located on a mobile pick station through a network node proxy.

The mobile pick station includes a touchscreen display, a barcode scanner, a pick-station processor and a network interface. The pick-station processor communicates with a remote data server that provides specification data for each manufacturing kit. From the specification data, a map of the manufacturing kit is generated and displayed onto the touchscreen display. This map guides the user through a kit replenishment process.

In addition to replenishing manufacturing kits, the system of the present invention can also be used to replenish the parts in the storage bins.

Further areas of applicability of the present invention will become apparent from the detailed description provided hereinafter. It should be understood that the detailed description and specific examples are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
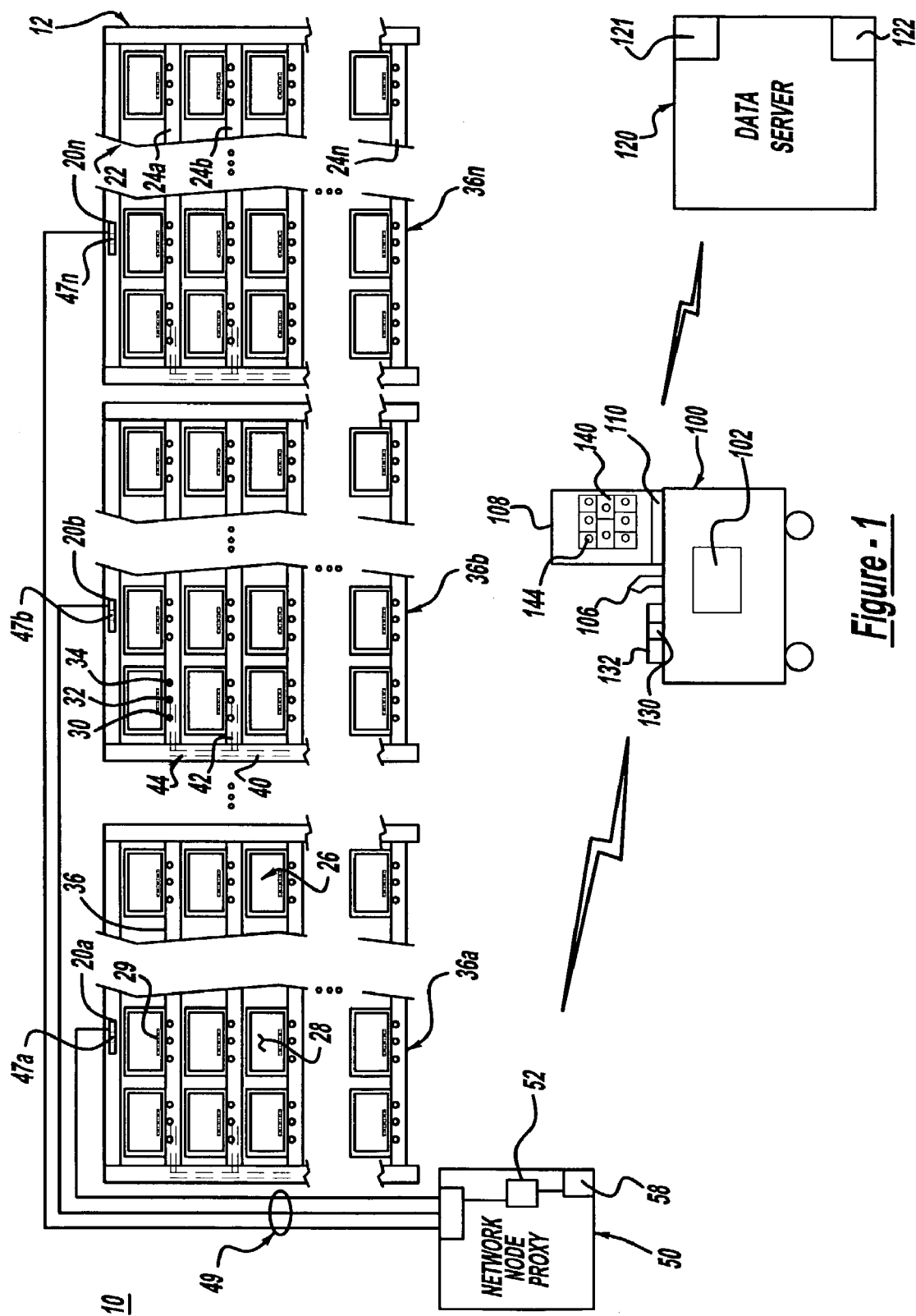
FIG. 1 is a schematic illustration of a pick-to-light system of the present invention.

FIG. 1 illustrates an inventory management system for replenishing manufacturing kits using a pick-to-light system 10 that generally includes a shelving system 12, a network node proxy 50, a mobile pick-to-light cart 100, and a data server 120. Shelving system 12 is electrically divisible into racks 36a, 36b . . . 36n each having individual rack control units 20a, 20b . . . 20n. Multiple columns of racks 36a, 36b . . . 36n, each having shelves 24a, 24b . . . 24n, are shown. More or fewer racks of shelves may be included, but seven shelves per rack is typical.

The rack structure of shelving system 12 is constructed with vertical and horizontal channels 40, 42 that house system communication circuitry 44 including shelf electronics and rack communication circuitry. Rack control units, located proximate to each rack 36a, 36b . . . 36n include rack processors 47a, 47b . . . 47n. Peer to peer communication between racks 36a, 36b . . . 36n is accomplished via a node communications bus 49 connected to each rack processor 47a, 47b . . . 47n within rack control units 20a, 20b . . . 20n.

Each shelf 24a, 24b . . . 24n holds several storage bins 26. Depending upon the system design, the number of shelves 24a, 24b . . . 24n and storage bins 26 may vary, but seven or eight storage bins 26 per shelf 24a, 24b . . . 24n is typical. Each storage bin 26 has a label designation referred to as a pick-face 28 that includes a barcode 29 identifying, for example, the part number, type and quantity of each part. Located below each pick-face 28 is a group of indicator lights or pick-lights, generally one red 30, one yellow 32 and one green 34. Pick-lights 30, 32, 34 can be assigned for different purposes including, but not limited to, one light used for a person replenishing kits, a second for a person assembling a different kit that may use some of the same parts, and a third for a person restocking the kit bins.

Network node proxy 50 includes a node processor 52 communicating with rack control units 20a, 20b . . . 20n via node communications bus 49. In addition, network node proxy 50 receives and processes commands from mobile pick station 100 via an Ethernet or other communication platform through network interface 58. Preferably, network interface 58 is a wireless network interface.

Mobile pick station 100 includes a pick station processor 102 in communication with a barcode scanner 106, a touchscreen display 108, and a network interface 110. Network interface 110 communicates with data server 120 and network node proxy 50. Preferably, such communication is wireless. The examples used herein are applicable one mobile pick station 100, however, multiple pick stations 100 can be used simultaneously for different tasks.

Data server 120 includes databases, images, and programs needed to operate the pick-to-light system 10. In addition, data server 120 includes a web server 121 for processing web-related applications. Generally, the communication between mobile pick station 100 and data server 120 is via communications interface 122 and is preferably wireless. Other equivalent communication platforms may also be used.

The pick-to-light system 10 is capable of replenishing one or more manufacturing kits 132 simultaneously using a barcode 130 to track each manufacturing kit 132. Barcode 130 affixes to the outside of each manufacturing kit 132 providing specification information relating to the type of parts needed for replenishment, the cost, and the quantity and location of each part within the manufacturing kit 132.

Figure 2:
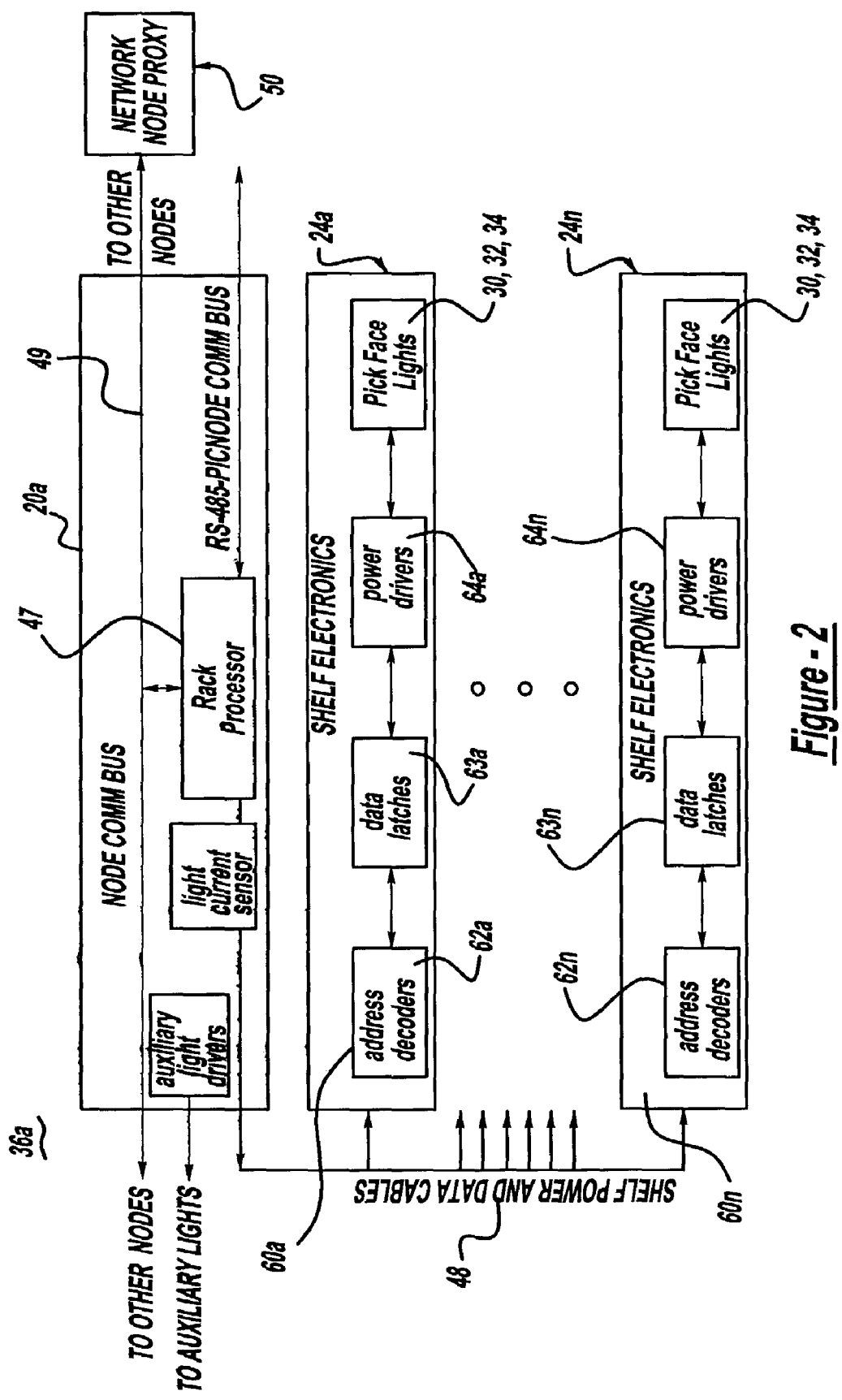
FIG. 2 is an illustration of a rack system for the pick-to-light system according to the present invention.

FIG. 2 is a schematic representation of shelving system 12 electronics embedded within vertical and horizontal channels 40, 42. Each rack 36a, 36b . . . 36n includes a rack control unit 20a, 20b . . . 20n providing power, control, and communication through power and data cables 48. Each rack control unit 20a, 20b . . . 20n has a rack processor 47a, 47b . . . 47n connected to a communications bus 49 that provides a communications link to network node proxy 50 and to other rack processors 47a, 47b . . . 47n. Rack processor 47a, 47b . . . 47n also monitors the status of the pick-face lights 30, 32, 34 and controls other shelf electronics 60a, 60b . . . 60n such as a shelf address decoders 62a, 62b . . . 62n, data latches 63a, 63b . . . 63n, and power drivers 64a, 64b . . . 64n. Shelf electronics 60a, 60b . . . 60n are connected to rack control units 20a, 20b . . . 20n through data cables 48 embedded within vertical and horizontal channels 40, 42.

Figure 3A:
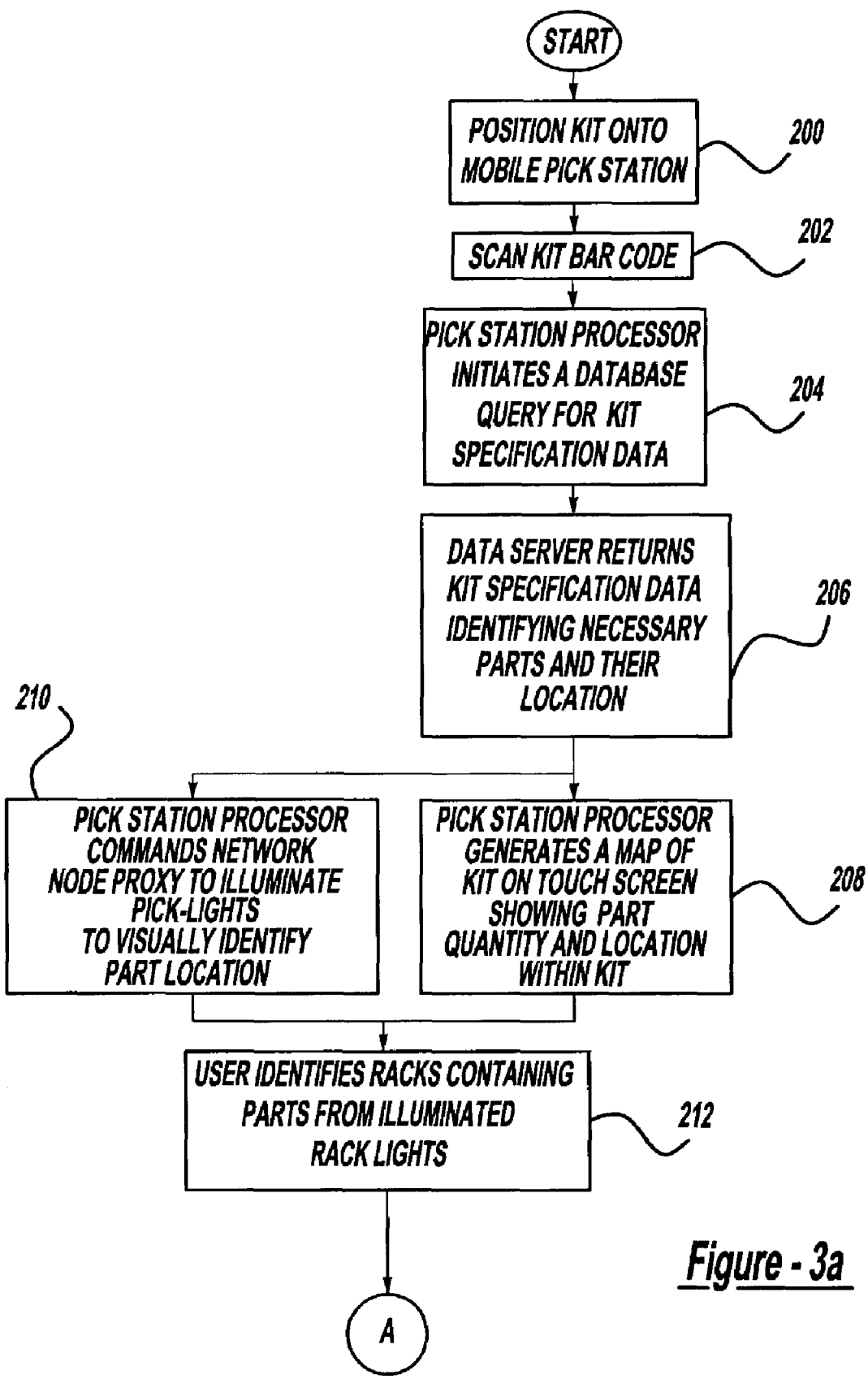
FIGS. 3a and 3b depict a flow diagram for a pick-to-light method according to the invention.
Figure 3B:
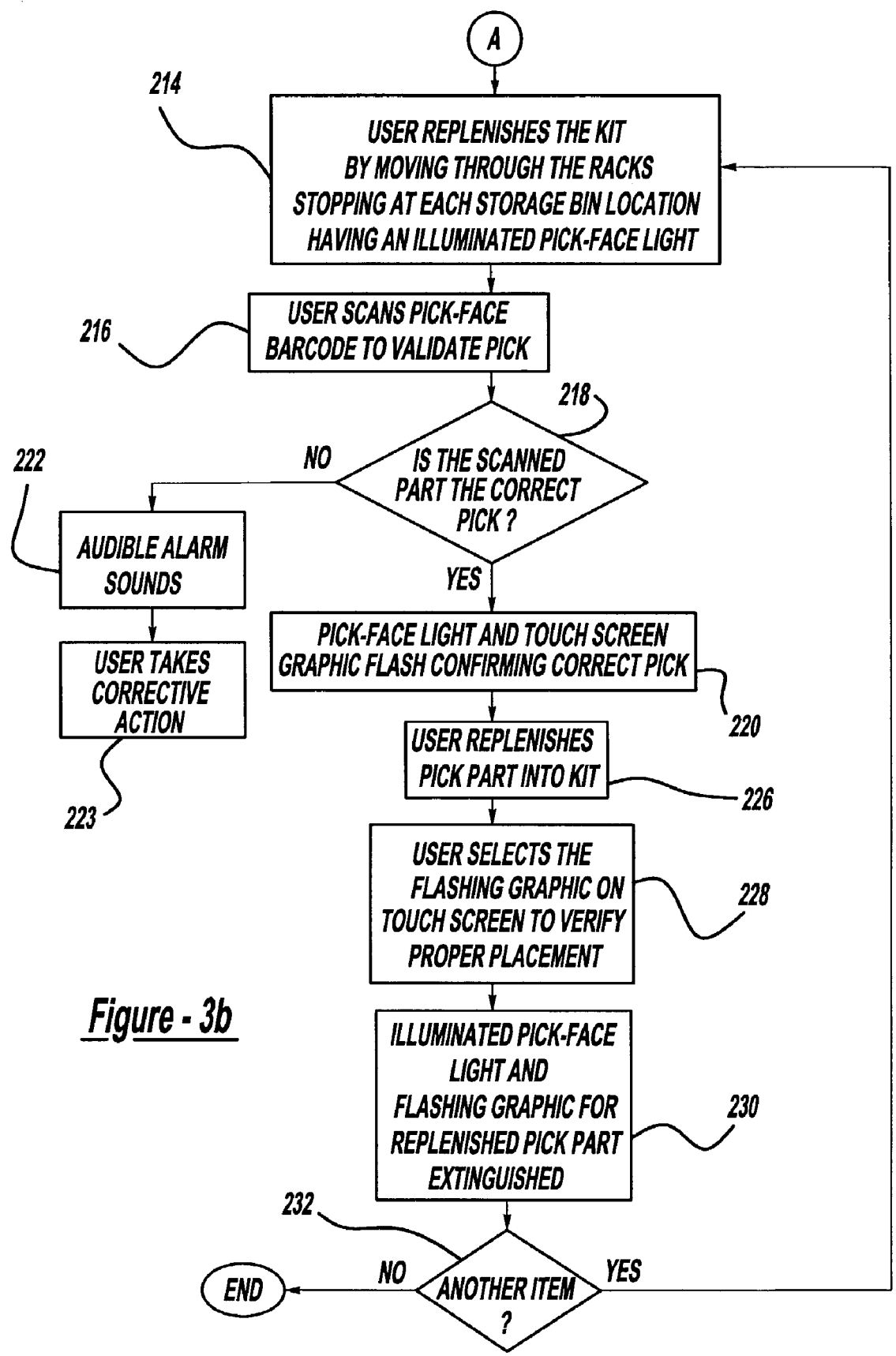

As shown in FIGS. 3a and 3b, a method according to the invention begins at steps 200 and 202, respectively, by placing a manufacturing kit 132 onto mobile pick-station 100 and scanning the kit barcode 130 using the mobile pick station scanner 106. Upon scanning at step 204, pick station processor 102 initiates a database query to data server 120 for kit specification data via network interface 110. At step 206, the query provides mobile pick station 100 with kit specification data identifying the parts need for replenishment and their locations.

At step 208 the retrieved data is used to generate a map 140 of the selected manufacturing kit onto touchscreen display 108, which is located on mobile pick station 100. The map 140, shown in FIG. 4, visually represents an overlay of the manufacturing kit 132 and shows the respective specification data including the kit compartments 150. A color-coded graphic 144, located inside the compartment 150, is coded to match the color of illuminated pick-light 30, 32, 34. Inside the color-coded graphic 144 there is information 148 representing the type of part needed for that compartment 150, and the quantity and storage bin location 26 of the part.

In conjunction with step 208, the specification data retrieved by the query of step 206, is used by the pick station processor 102 at step 210 to command the network node proxy 50 to illuminate one of the three pick-lights 30, 32, 34 located below the pick-face 28 of each part in the selected kit 132. At step 212, the map 140 and illuminated pick-lights 30, 32, 34 guide the user to the location of the parts needed to replenish the manufacturing the kit 132.

As previously mentioned, the system 10 is capable of replenishing more than one manufacturing kit 132, simultaneously. The currently displayed map 140 is shown in a list of active kits 141. The user may change the displayed kit by selecting the desired kit from the listing 141. In addition, the system 10 can also perform tasks such as restocking the storage bins and servicing emergent requirements. For example, a red pick-face light may indicate a part is needed for kit replenishment, while the same set of pick-face lights 30, 32, 34 has a yellow light illuminated representing a servicing emergent requirement. Further, a green light may be lit to represent parts needing to be restocked. This multi-tasking allows more than one user to use the system at the same time. An emergent requirement process is discussed below.

Figure 4:
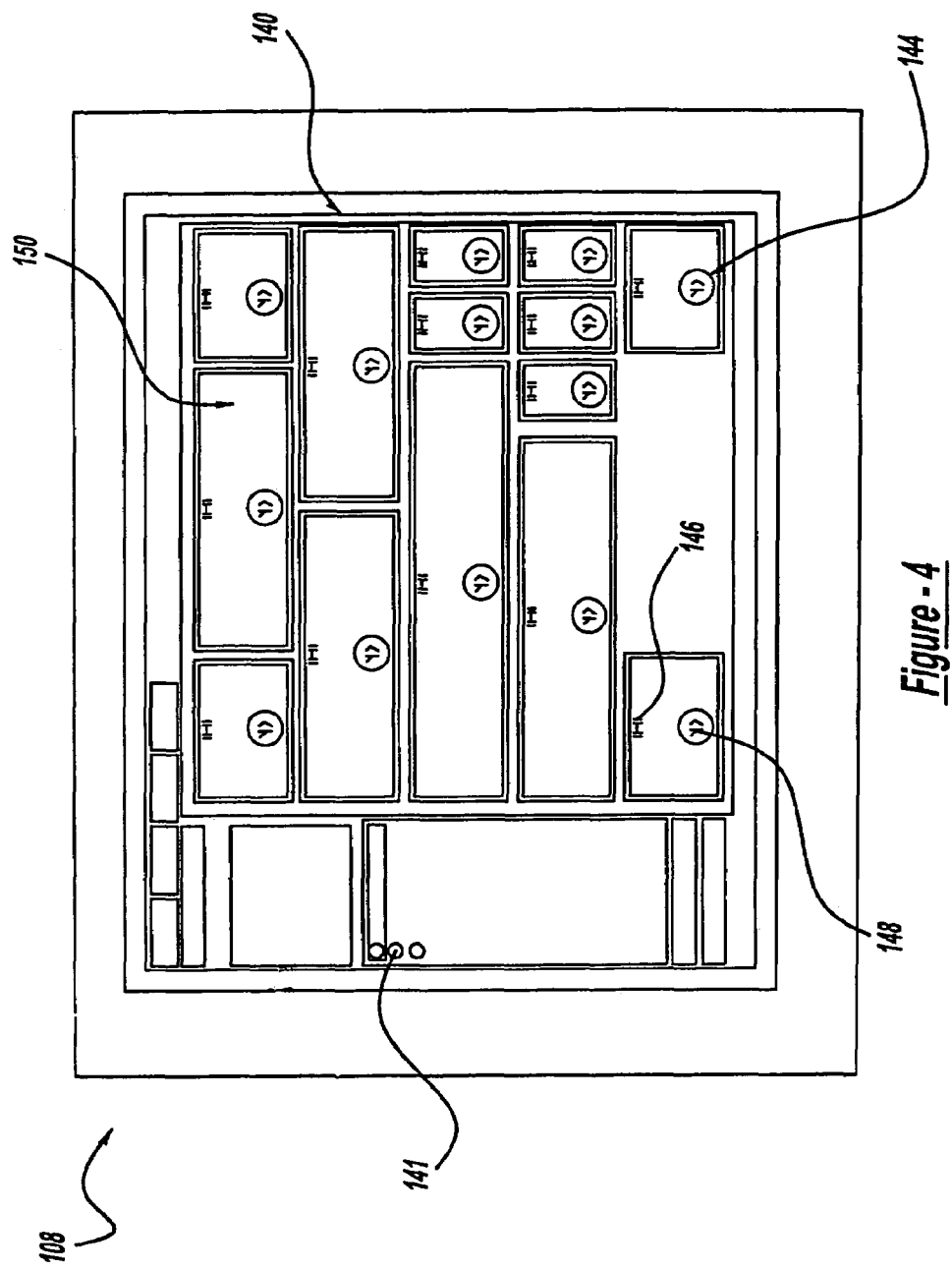
FIG. 4 is a screen shot of a touch screen interface for the pick-to-light system of the present invention.

Continuing with FIG. 3b, at step 214, a user replenishes a kit 132 by moving mobile pick station 100 to each storage bin 26 location having an illuminated pick-face light 30, 32, 34. At step 216, once the user is at the storage bin location 26, the user scans the pick-face barcode 29, using the scanner 106, to validate the pick. At step 218, the system 10 determines whether the correct pick-face 28 was scanned. At step 220, if the correct pick-face 28 was scanned, at least one illuminated pick-face light 30, 32, 34 and color-coded graphic 144 begin to flash confirming the correct selection. The flashing color-coded graphic 144 is intended to guide the user to place the selected part into the proper kit compartment 150. A photo of the desired part, along with other specification data, is displayed on the map 140 as shown in FIG. 4. At step 222, if an incorrect pick-face 28 was selected, an audible alarm sounds indicating to the user that the wrong pick-face 28 was scanned and the correct part needs to be located. At step 223, the user takes corrective action to resolve the error.

After replenishing the part into the kit at step 226, the user selects the flashing graphic 144 on the touch screen 108, at step 228, to reconfirm that the part has been placed in the, correct compartment 150. By selecting the flashing graphic 144 at step 230, the correct placement of the part is confirmed and one or more of the illuminated pick-face lights 30, 32, 34 and the flashing graphic are extinguished. At step 232, the user moves to the next illuminated pick-face light 30, 32, 34 to make another selection until the kit is completely replenished.

Figure 5:
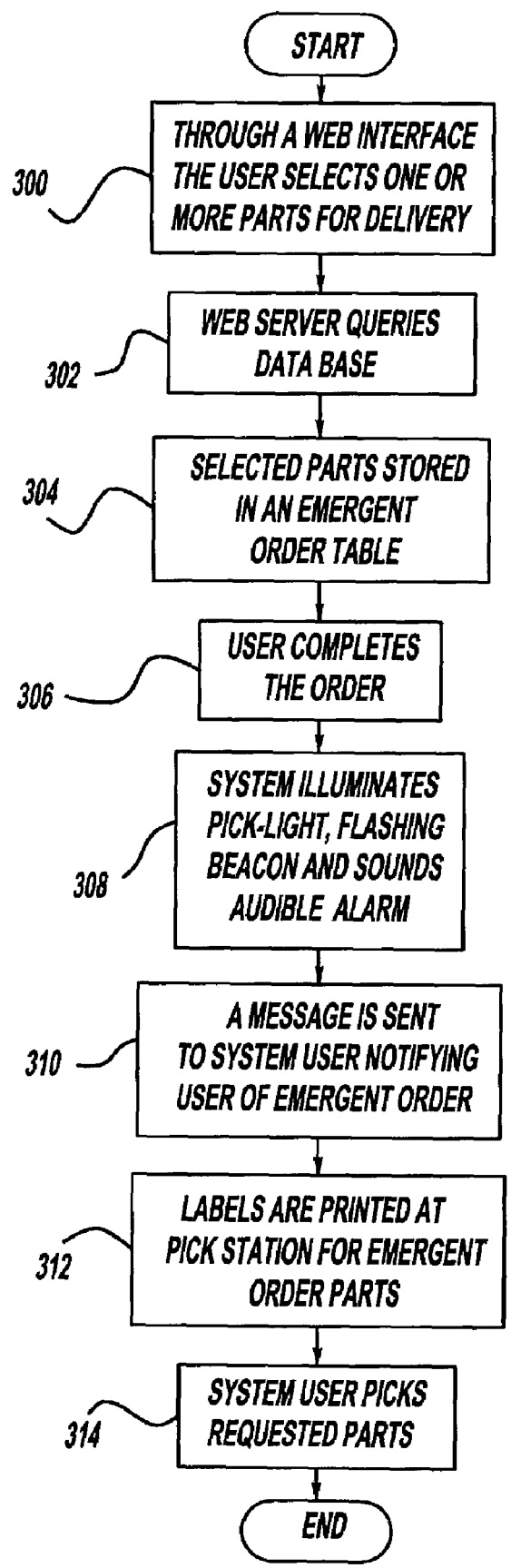
FIG. 5 depicts a flow diagram for servicing emergent requirement with a pick-to-light method according to the inventor.

FIG. 5 illustrates a method according to the present invention for servicing emergent requirements. An emergent requirement is an unanticipated need received from the factory floor for a pick part that was either not found in the kit being on the part was found defective. In either case, the part is needed on the factory floor quickly.

At step 300, a user, typically a floor mechanic from the work site, using a web interface, orders the parts needed to complete a job. At step 302, once the parts are selected, the web server 121 queries a database for information related to the selected parts. The selected parts are stored into an emergent order table at step 304, until the user completes the order at step 306. The system 10 sends the request to the pick area and notifies the user by illuminating one or more of the corresponding pick-lights 30, 32, 34, by flashing a beacon light and by sounding an audible alarm. In addition, the system 10 sends a message at step 310, generally via an alphanumeric pager, to the pick area user communicating the emergent requirement order. Labels are printed at step 312 at the pick station 100 for labeling special order part bags. At step 314, the pick area user fills the emergent order in the same manner as the kit replenishment process explained above. Preferably, an emergent order can be filled and delivered to the user within three minutes of requesting the order.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pick-to-light method comprising:
   scanning a barcode affixed to a manufacturing kit using a scanner associated with a mobile pick station;
   retrieving manufacturing kit specification data via said scanning, said specification data including at least one of type, quantity, and location of parts;
   processing said specification data at said mobile pick station to generate a map of said manufacturing kit from said specification data, said map indicating placement of said parts within said manufacturing kit for guiding replenishment of said manufacturing kit;
   displaying said map at said mobile pick station;
   communicating said specification data to a system controlling illumination of multiple pick lights;
   illuminating at least one of said multiple pick lights on a first one of said shelving structures to visually identify the location of said parts;
   scanning a pick face barcode on a pick face at said identified location of said parts to verify pick-face location;
   replenishing said parts into said kit according to said kit specifications displayed on said map; and transporting said mobile pick station to a second one of said shelving structures.

2. The method of claim 1 further comprising selecting an image of replenished parts on said map to verify part selection.

3. The method of claim 1 further comprising de-illuminating said pick lights in response to replenishing said parts.

4. The method of claim 1 wherein said specification data includes type, quantity, and location of said parts.

5. The method of claim 1 further comprising the step of storing said manufacturing kit specification data in a database associated with said mobile pick station.

6. The method of claim 1 wherein said step of communicating said specification data includes communicating said specification data from said mobile pick station to a data server associated with said shelving structures.

7. The method of claim 6 wherein said step of communicating said specification data includes communicating said specification data to a network node proxy via a wireless network interface.

8. The method of claim 7 wherein said illuminating said pick light to visually identify the location of said parts is controlled by said network node proxy.

9. The method of claim 1 further comprising the step of flashing a beacon light.

10. The method of claim 1 further comprising the step of sounding an audible alarm.

11. A pick-to-light system comprising:
   a manufacturing kit having a kit barcode affixed thereto, said barcode indicating at least one of a type and quantity of kit parts necessary to replenish said manufacturing kit;
   a plurality of shelving structures, each shelving structure including a plurality of storage bins for storing said kit parts, said storage bins including a bar-coded pick-face identifying a type of said kit parts in each of said plurality of storage bins;
   a data server storing manufacturing kit specification data and including a communication interface;
   a control unit associated with each of said shelving structures and operable to route data;
   a network node proxy associated with said control unit, said network node proxy including a node processor and a node interface, said node processor processing commands through said node interface;
   a mobile pick station including a pick station processor in communication with said control unit and said data server;
   a barcode scanner in communication with said pick station processor and operable to read said kit barcode and said bar-coded pick-face;
   a display associated with said mobile pick station and operable to display data from said pick station processor, said display outputting a map of said manufacturing kit derived from said manufacturing kit specification data, said map indicating placement of said parts within said manufacturing kit for guiding replenishment of said manufacturing kit; and
   a plurality of indicator lights associated with each of said shelving structures and operable to illuminate on command from said control unit;
   wherein said pick station processor is in communication with said network node proxy and said data server via a network interface, said pick station processor further operable to transmit data to said control unit via said network node proxy.

12. The system of claim 11 wherein each of said shelving structures include a plurality of racks.

13. The system of claim 12 wherein each said control unit is a plurality of rack control units and wherein each of said racks of said shelving structures include one of said plurality of rack control units.

14. The system of claim 13 wherein each of said plurality of rack control units includes a rack processor connected to a node communications bus operable to route data between each of said plurality of racks.

15. The system of claim 14 wherein each of said rack processors is operable to process commands via said node communications bus to a network node proxy.

16. The system of claim 15 wherein said network node proxy includes a node processor and a node interface, said node processor processing commands through said node interface.

17. The system of claim 16 wherein said pick station processor is in communication with said network node proxy and said data server via a network interface, said pick station processor further operable to transmit data to said control unit via said network node proxy.

18. The system of claim 11 wherein each of said shelving structures further include vertical and horizontal channels containing circuitry for shelf and rack communication.

* * * * *